United States Patent [19]
Adler et al.

[11] Patent Number: 6,009,409
[45] Date of Patent: Dec. 28, 1999

[54] SYSTEM AND METHOD FOR SCHEDULING AND CONTROLLING DELIVERY OF ADVERTISING IN A COMMUNICATIONS NETWORK

[75] Inventors: Micah A. Adler, Concord, N.H.; Phillip B. Gibbons, Westfield, N.J.; Yossi Matias, Potomac, Md.

[73] Assignee: Lucent Technologies, Inc., Murray Hill, N.J.

[21] Appl. No.: 08/832,409

[22] Filed: Apr. 2, 1997

[51] Int. Cl.⁶ .................................................. G06F 17/60
[52] U.S. Cl. ............................................................ 705/14
[58] Field of Search ................................ 705/14, 1, 8

[56] References Cited

U.S. PATENT DOCUMENTS

| | | | |
|---|---|---|---|
| 5,347,632 | 9/1994 | Filepp et al. | 705/14 |
| 5,504,675 | 4/1996 | Cragun et al. | 705/14 |
| 5,740,549 | 4/1998 | Reilly et al. | 395/200.32 |
| 5,784,138 | 7/1998 | Kollarits et al. | 349/93 |
| 5,784,269 | 7/1998 | Jacobs et al. | 363/89 |
| 5,809,481 | 9/1998 | Baron et al. | 705/14 |
| 5,848,397 | 12/1998 | Marsh et al. | 705/14 |

FOREIGN PATENT DOCUMENTS

| | | | |
|---|---|---|---|
| 0 749 081 A1 | 12/1996 | European Pat. Off. | 17/60 |
| WO 97/07656 | 6/1997 | WIPO | 13/36 |

OTHER PUBLICATIONS

Dan Lester, "Yahoo, Profile of a Web Database. The 1.4 Access Method Used for Browsing Yahoo is a Hierarchical Structure or Outline," Database, vol. 18, No. 6, Dec. 1995, pp. 46–50.

Dan Lester, "Profile of a Web Database. The 1,4 Access Method Used for Browsing Yahoo is a Hierarchical Structure or Outline," vol. 18, No. 6, Dec. 1995, pp. 46–50.

*Primary Examiner*—Allen R. MacDonald
*Assistant Examiner*—Michele Stuckey Crecca

[57] ABSTRACT

A system and method for scheduling and controlling delivery of advertising in a communications network and a communications network and remote computer program employing the system or the method. The system includes: (1) a time allocation controller that allocates time available in a particular advertising region in a display device of a remote computer between at least two advertisements as a function of one of a desired user frequency, a desired time frequency, or a desired geometry, for each of the at least two advertisements and (2) data communication controller, coupled to the time allocation controller, that delivers the at least two advertisements to said remote computer for display in the advertising region according to the allocating of the time.

22 Claims, 3 Drawing Sheets

SYSTEM AND METHOD FOR SCHEDULING AND CONTROLLING DELIVERY OF ADVERTISING IN A COMMUNICATIONS NETWORK

TECHNICAL FIELD OF THE INVENTION

The present invention is directed, in general, to communications networks and, more specifically, to a system and method for scheduling and controlling delivery of advertising in a communications network.

BACKGROUND OF THE INVENTION

The Internet is a well-known collection of networks (e.g., public and private communications networks) that work together using common protocols to form a world wide network of networks. In recent years, the availability of more efficient, reliable and cost-effective computers and networking tools has allowed many companies and individuals (collectively, "users") to become involved in an ever growing electronic marketplace. The immeasurable gains in technology experienced by the computer industry overall have allowed these users to rely on commercially available computers, such as personal computers ("PCs"), to meet their information processing and communications needs. To that end, PC manufacturers equip most PCs with interfaces for communication over networks, such as the Internet.

The Internet continues to increase its position as an integral place for businesses that offers information and services to potential customers. One of the main funding sources for many of these businesses is advertising over the Internet (popular examples of such advertising include news providers, car dealerships, software providers, book stores, etc.). Many existing Internet home pages have one or more regions allocated to advertising, and in the future the volume of this advertising will increase—not only on home pages, but also on Internet browsers, as it is likely that Internet browsers such as NETSCAPE® will allocate one or more regions to advertising.

Typically, the region provided by an Internet advertising provider is not a simple, static billboard. Current Internet technology makes possible continuous, dynamic updates to the contents of advertising regions. An important motivation for this is that providers with a high volume of users may charge higher prices for advertising region, and parcel the space between different advertisements thereby making the advertising region accessible to a larger number of advertisers. Such parceling can be accomplished by selling an advertising region that is smaller than the total area available, by displaying different advertisements to different users, by dynamically changing the advertisements seen by a given user, or by some combination of two or more of the same.

What is needed in the art is a system and method for efficiently scheduling the display of advertisements in a communications network, such as the Internet.

SUMMARY OF THE INVENTION

To address the above-discussed deficiencies of the prior art, the present invention provides a system and method for scheduling and controlling delivery of advertising in a communications network (e.g., a private intranet, the public Internet, etc.), as well as a communications network and remote computer program employing the system or the method. The phrase "communications network," as it is used herein, is defined broadly to include any processing system network capable of communicating advertising information between two points within the network (thereby linking the two points), wherein such communication is under at least one form of standard control (e.g., at least one protocol). Advertising information may include text, image, video, audio or other suitable data that may be subject to scheduling and delivery control in such a communications network according to the present invention. Those skilled in the pertinent art should understand that suitable communications networks may be wired (e.g., electrical, optical or other communications channels) or wireless (e.g., radio or other communications channels).

An exemplary system broadly includes a time allocation controller and a data communication controller. The time allocation controller allocates time available in an advertising region of a display file for display on a display device of a remote computer, the time available in the advertising region is allocated between at least two advertisements as a function of at least one of (a) a desired user frequency, (b) a desired time frequency, or (c) a desired geometry, for each of the at least two advertisements. The data communication controller, that is associated with the time allocation controller, delivers the at least two advertisements to the remote computer for display in the advertising region according to the allocating of the time. Those skilled in the pertinent art will likewise understand that any "controller" according to the principles of the present invention may be software-, firmware- or hardware-based, or, alternatively, may be implemented using some suitable combination of at least two of the three.

As is described in detail hereinbelow, the present invention introduces a sophisticated way of allocating advertising resources in the communications network that optimizes utilization of the advertising region. "User frequency," as the phrase is used herein, is defined as the fraction of accesses hy users that result in a particular advertisement being seen by the users. "Time frequency," as the phrase is used herein, is defined as the fraction of time that a particular advertisement is displayed to a given user, given that the particular advertisement is displayed to that user at all.

In an embodiment wherein the time allocation controller allocates the time available in the particular advertising region as a function of geometry, the geometry is of at least zero dimension (i.e., in a zero dimension geometry, the geometry is ignored—aural only, for example). If the advertisements are graphical, their dimensions are of width, height, depth, etc. If the advertisements are aural or otherwise, their dimensions are of time, volume, etc. The present invention is of course not limited to a particular type of advertising, and may be suitably adapted to various dimensional requirements or multiple types of advertising.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings wherein like numbers designate like objects, and in which.

DETAILED DESCRIPTION

Figure 1:
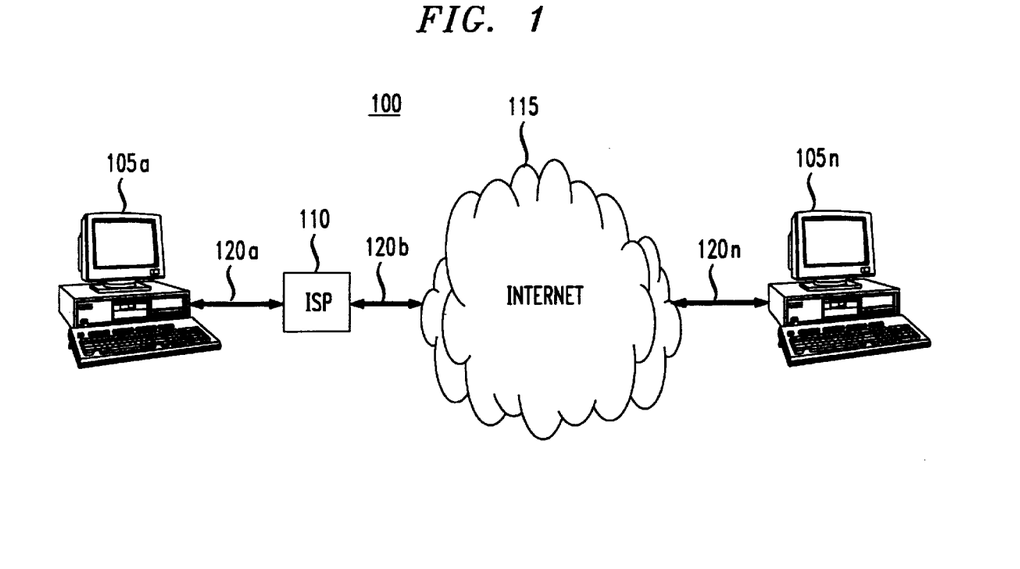
FIG. 1 illustrates a block diagram of an exemplary communications network according to the principles of the present invention, the communications network illustrating an implementation that includes a conventional Internet service provider.

Referring initially to FIG. 1, illustrated is a block diagram of an exemplary communications network (generally designated 100) according to the principles of the present invention. Communications network 100 illustratively includes a plurality of remote computers 105a to 105n, an Internet service provider ("ISP") 110 and a sub-communication, network, namely, Internet 115. "Include" and derivatives thereof, as used herein, mean inclusion without limitation.

Exemplary remote computers 105a to 105n may be, for example, any suitably arranged conventional computer or computer network that may be associated with a communications network—remote computers 105a to 105n are each capable of being associated with (subscribing to) ISP 110. Exemplary ISP 110 may be, for example, any suitable windows-based on-line computer service (e.g., NETCOM®, AMERICA ON-LINE®, COMPUSERVE®, PRODIGY®, etc.) that provides E-mail; forums; software downloads; news, weather, sports, financial or other like information; electronic commerce; on-line gaming; or other features over Internet 115 to its subscribers. Internet 115 is a known world-wide public network that includes the World Wide Web. The World Wide Web is also known. Exemplary remote computers 105 and ISP 110 may include personal, laptop, mini, main frame and super computers, as well as public or private networks of computers, such as local-area, metropolitan-area or wide-area networks, as examples. Remote computers 105a to 105n, ISP 110 and Internet 115 are illustratively associated via a plurality of conventional communications links 120. "Associated," "associated with" and derivatives thereof, as used herein, may mean to include within, interconnect with, contain, be contained within, connect to or with, couple to or with, be communicable with, juxtapose, cooperate with, interleave, be a property of, be bound to or with, have, have a property of, or the like. The term "or," as used herein, is inclusive, meaning and/or.

According to the illustrated embodiment, ISP 110 is capable of scheduling and controlling delivery of advertising within communications network 100.

Figure 2:
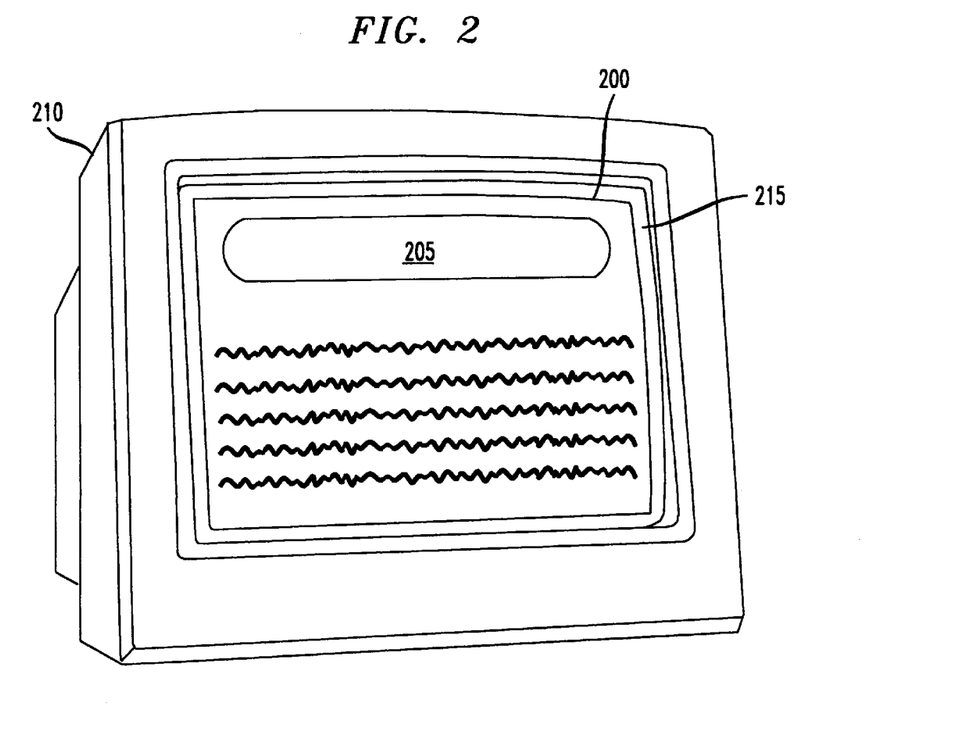
FIG. 2 illustrates an exemplary full screen window of a conventional Internet interface that is operative, in part, to provide an advertising region.

Turning momentarily to FIG. 2, illustrated is an exemplary window 200 of a conventional Internet interface or browser. The Internet interface is operative, at least in part, to display advertisements in an advertising region 205 of window 200. According to the present embodiment, display files, including a display file associated with window 200, are communicated between ISP 110 and remote computer 105. The techniques for displaying ones of such display files to a display device 210 of remote computer 105 are known. It is sufficient for purposes of the present discussion therefore that window 200 is conventionally displayed.

It should be noted that window 200 is a movable, sizable window that covers a region that may be all or only a portion of the entire area of a display screen 215 of display device 210 (conventionally, multiple windows can overlap and occlude one another, much the way papers overlap and occlude one another on a desktop). APPLE COMPUTER CORP., MICROSOFT CORP., IBM and other computer software providers have all developed windowing (graphical user interface) environments capable of supporting Internet interfaces.

Exemplary advertising region 205 is capable of displaying graphical (e.g., text, image, video, etc.) advertisements. Each advertisement has at least one dimension (e.g., width, height, depth, etc.). It should be understood that although a single advertising region is illustrated, the present invention may be implemented and used in association with any number of advertisements, advertising regions or display devices. Further, the advertisements need not be visual, but rather may be, at least in part, aural or otherwise, and their dimensions may be, for example, time, volume or the like. The present invention is not limited to a particular type of advertising over a communications network, and may therefore be adapted to any suitable dimensional constraints.

Returning to FIG. 1, ISP 110 is operative to schedule and control delivery of advertising to advertising region 205. More particularly, ISP 110 allocates time available in advertising region 205 of the display files between at least two advertisements as a function of at least one of a desired user frequency, a desired time frequency, and a desired geometry, for each of at least two advertisements (if there is only one advertisement, then it can be displayed). ISP 110 then delivers the two or more advertisements to ones of the display files and makes some of the display files available to remote computers 105a to 105n for display therein according to the allocating of the time.

In an advantageous embodiment to be discussed in detail with reference to FIG. 5, the principles of user frequency, time frequency and geometry may be combined in a sophisticated way to allocate advertising resources of communications network 100 that optimizes utilization of advertising region 205.

Although the present invention is described in the context of the Internet, its principles and broad scope may be used or associated with any suitably arranged communications network, including for example, telephony, computer, multimedia or other network, whether wired or wireless, that includes a plurality of remote computers (e.g., stations, nodes, junctions points, clients, etc.), and that can be accessed or browsed by users (such communications networks specifically do not include radio or television broadcast networks). An important aspect of the present invention is that it is advantageously suited to schedule and control the distribution and delivery of advertising content (e.g., sights, sounds or other, such as later-developed media) over the Internet or other suitably arranged communications network, whether now known or later developed.

Although the principles of the present invention have been described generally with reference to ISP 110, alternate embodiments of the present invention may be distributed over a plurality of computers or communications networks, or may include partial or complete implementation within remote computers 105a to 105n, such as in a remote computer program (e.g., a browser). More generally, conventional communications principles and theories are discussed in *The Irwin Handbook of Telecommunications*, by James Harry Green, Irwin Professional Publishing (2nd ed. 1992); *Data Communications Principles*, by R. D. Gitlin, J. F. Hayes and S. B. Weinstein, Plenum Press (1992); *Data Network Design*, by Darren L. Spohn, McGraw-Hill, Inc. (1993); *Optical Fiber Telecommunications II*, Stewart E. Miller and Ivan P. Kaminow, Academic Press (1988); *Integrated Optoelectronics*, by Mario Dagenais, Robert F. Leheny and John Crow, Academic Press (1995); and *Voice and Data Communications Handbook*, by Bud Bates and Donald Gregory, McGraw-Hill, Inc. (1996). Each of the foregoing publications is incorporated herein by reference for all purposes as if fully set forth herein.

Figure 3:
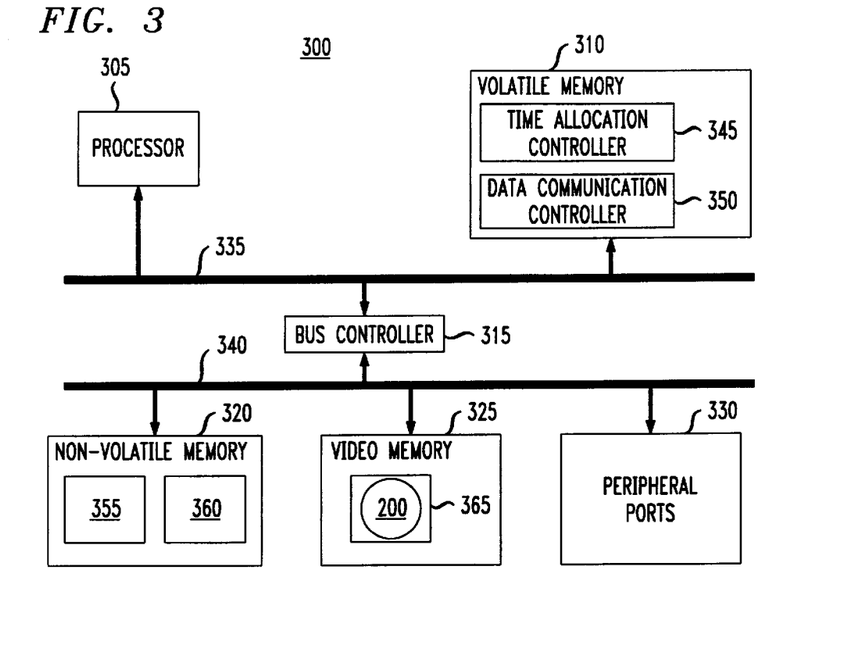
FIG. 3 illustrates a block diagram of exemplary processing circuitry that may be suitably associated with the Internet service provider of FIG. 1 according to the principles of the present invention.

Turning to FIG. 3, illustrated is a block diagram of exemplary processing circuitry (generally designated 300) that may be suitably associated with remote computers 105a to 105n or ISP 110 according to the principles of the present invention. Since the present invention is not limited to application in remote computers 105 or ISP 110, FIG. 3, like FIGS. 1 and 2, is illustrative only. According to alternate advantageous embodiments, processing circuitry 300 may, in whole or in part, be replaced by or combined with any suitable processing configuration, including parallel processors, programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like, to form the various types of controllers and systems described and claimed herein. Conventional computer system architecture is more fully discussed in *The Indispensable PC Hardware Book*, by Hans-Peter Messmer, Addison Wesley (2nd ed. 1995) and *Computer Organization and Architecture*, by William Stallings, MacMillan Publishing Co. (3rd ed. 1993); and conventional electronic circuit design is more fully discussed in *The Art of Electronics*, by Paul Horowitz and Winfield Hill, Cambridge (2nd ed. 1989). Each of the foregoing publications is incorporated herein by reference for all purposes.

Exemplary circuitry 300 illustratively includes a processor 305, conventional volatile memory (e.g., random access memory) 310, bus controller circuitry 315, a conventional non-volatile memory (e.g., read only memory) 320, a conventional video memory (e.g., video random access memory) 325 and a set of peripheral ports 330. An exemplary host bus 335 is shown and is suitably operative to associate processor 305, volatile memory 310 and bus controller circuitry 315. An exemplary input/output ("I/O") bus 340 is shown and is operative to associate bus controller circuitry 315, non-volatile memory 320, video memory 325 and the set of peripheral ports 330. The set of peripheral ports 330 may suitably couple I/O bus 335 to any one or more of a plurality of conventional peripheral devices for communication therewith, such as communications circuitry for communication with Internet 115 or other communications network. Included among the set of peripheral ports 330 may be one or more serial or paralle ports.

Bus controller circuitry 315 provides suitable means by which host bus 335 and I/O bus 340 may be associated, thereby providing a path and management for communication therebetween. Each of the illustrated buses 335 and 340 requires a drive current to carry signals thereon. The illustrative circuit accordingly operates in conjunction with a conventional system controller (not shown) that supplies the required drive current. It should be noted that while ISP 110 illustratively includes a dual-bus configuration, alternate embodiments may include single-bus or greater than two-bus configurations.

For purposes of illustration, concurrent reference is made to FIGS. 1 and 2. Exemplary volatile memory 310 includes an executable version of each of a time allocation controller 345 and a data communication controller 350. Exemplary time allocation controller 345 is capable, upon execution, to allocate time available in advertising region 205 of display screen 215 of a display file 365 between at least two advertisements 355, 360 (illustratively stored in non-volatile memory 320) as a function of at least one of a desired user frequency (U(I)), a desired time frequency, (F(I)), or a desired geometry, (S(I)), for the each of advertisements 355, 360. Exemplary data communication controller 350 is capable, also upon execution, to deliver advertisements 355, 360 to advertising region 205 for display with display screen 200 according to allocation of the time.

As is described in greater detail hereinbelow, user frequency can relate to the fraction of accesses by users (e.g., of computer/station 105a) that result in a particular advertisement being seen by the users; the time frequency can relate to the fraction of time that a particular advertisement is displayed to users, given that the particular advertisement is displayed at all; and the geometry can relate to dimensions (at least zero). Recall that if advertisements 355, 360 are graphical, their dimensions may be of width, height, depth, or the like, or if advertisements 355, 360 are aural or otherwise, their dimensions may be of time, volume or the like (the present invention is of course not limited to a particular type of advertising).

Figure 4:
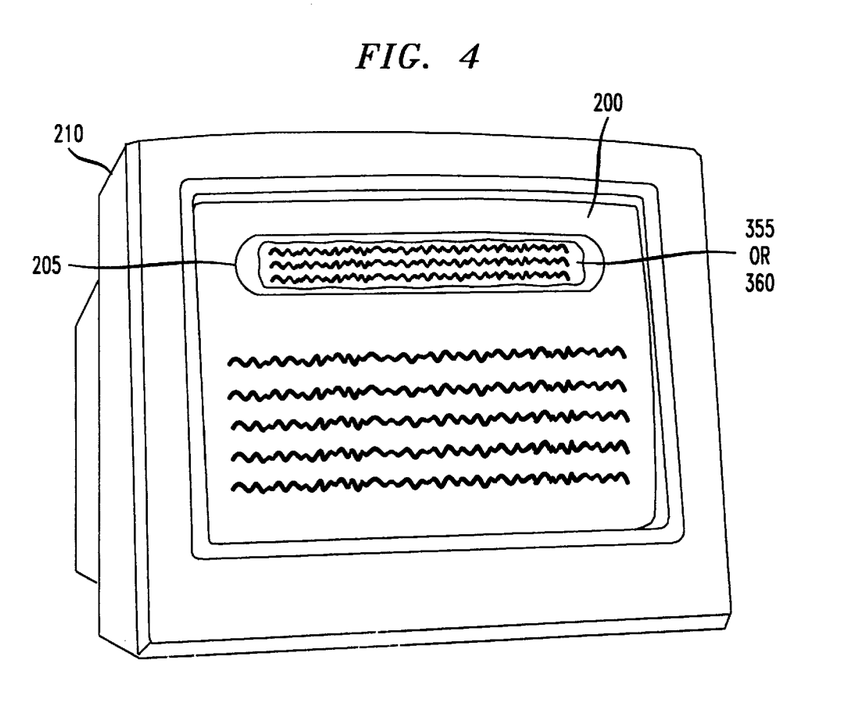
FIG. 4 illustrates another exemplary full screen window of the conventional Internet interface that provides the advertising region of FIG. 2.

Turning momentarily to FIG. 4, illustrated is another exemplary window 200 (occupying all of display screen 215) of another Internet interface that provides advertising region 205. Window 200 is again illustratively displayed on a conventional display device 210, and may be assumed to have the same general features and characteristics as window 200 of FIG. 2.

Exemplary advertising region 205 may be received into or associated with display file 365, which is stored in memory (e.g., volatile memory 310, video memory 325, etc.) located within and controlled by a remote computer program (discussed with reference to FIG. 6). The remote computer program, which may be a "browser" (e.g., NETSCAPE®), interacts with communications network 100 and allows a user to gain access to network data (e.g., window 200, display file 365, etc.). In an advantageous embodiment, the remote computer program may have a local advertising region 205, in lieu of or in addition to any advertising region 205 presented by communications network 100.

Regardless, exemplary advertising region 205 illustratively includes one of the two exemplary advertisements 355, 360. Each of advertisements 355, 360 is illustratively a two-dimensional ("2-D") graphical representation having both a width and a height. Alternatively, one or both of advertisements 355, 360 could include a third depth dimension, or include aural features, either a long with or in lieu of graphical representations. Such aural features might include playtime as a characteristic.

Returning FIG. 3, it is assumed for the purposes of discussion that scheduling controller 345 and data communication controller 350 are associated with a remote computer program. Data communication controller 350, upon execution in processing circuitry 300, makes display files 365 received from communications network 100 available for display to display screen 215 of remote computer 105. Recall, depending upon the embodiment, display screen 215 may be associated with a local advertising region 205, that is in lieu of, or in addition to, any advertising region 205 presented by communications network 100.

Scheduling controller 345, also upon execution in processing circuitry 300, controls delivery of advertising to either advertising region 205 by allocating time available in advertising region 205 between at least two advertisements as a function of at least one of a desired user frequency, a desired time frequency, and a desired geometry, for each of said at least two advertisements. Data communication controller 350 delivers the two or more advertisements with at least some of display files 365 to remote computer 105 for display on display screen 215 according to such allocating of time.

In alternative embodiments, regardless of whether the principles of the present invention are associated with remote computer 105, ISP 110, or otherwise associated with communications network 100, the delivery of advertisements to advertising region 205 may be in a predetermined or particular order. Further, the delivery of advertisements 355, 360 to advertising region 205 may be in a pseudorandom order. It is also important to note that the principles of the present invention may be implemented adaptively with respect to one or more of the three above-identified parameters of user frequency, time frequency, and geometry. The advantages of such an implementation may be illustrated by considering that some ISPs may be accessed (browsed) often, but each such access is of a short duration. In this case, the parameter of interest will be the user frequency of a given ad. For example, if the time frequency of all advertisements is 1, but the user frequency of different advertisements varies, then a given access by a particular user to an ISP will see an unchanging set of advertisements, but different accesses by different users may see different advertisements. On the other hand, for web browsers (e.g., NETSCAPE®), where each use has a fairly long duration, it is desirable to show different sets of advertisements periodically. In such a case, the time frequency of a given advertisement becomes the more important consideration.

With respect to the geometry parameter of the present invention, it is assumed that the region allocated by a provider (e.g., ISP, web browser, etc.) to advertising is fixed. Two geometry specifications (e.g., width only, and width and height) may be considered. If only one dimension needs to be specified, an ad, I, may be specified by a width, L(I), only. For example, on many existing providers, advertising region 205 consists of a horizontal bar and advertisements are shaped as rectangles. If every advertisement has height equal to the height of advertising region 205, then only the width of the advertisement need be specified. If, on the other hand, two dimensions need to be specified, the ad, I, will have a height and a width that may be smaller than the advertising region 205.

For purposes of further illustration, consider a twodimensional (it should be noted that the broader concept is a two-parameter advertisement scheduling problem) advertisement scheduling problem wherein T slots are given, each having a size S, and a set of advertisements, A, wherein each advertisement, I, of set A has a size $s_i \leq S$ and a weight $w_i \leq T$. The object of this illustration is to assign the advertisements to the slots such that advertisement, I, is assigned once to each of $w_i$ slots.

If P(j) is assumed to be the set of advertisements that are assigned to slot j, and $|P(j)| = \Sigma_{I \in P(j)} s_i$, then a particular advertisement assignment is valid if $\max_j |P(j)| \leq S$—a primary object of the illustrated embodiment is to efficiently find a valid schedule, if such exists, to allocate time available to a particular advertising region 205.

Figure 5:
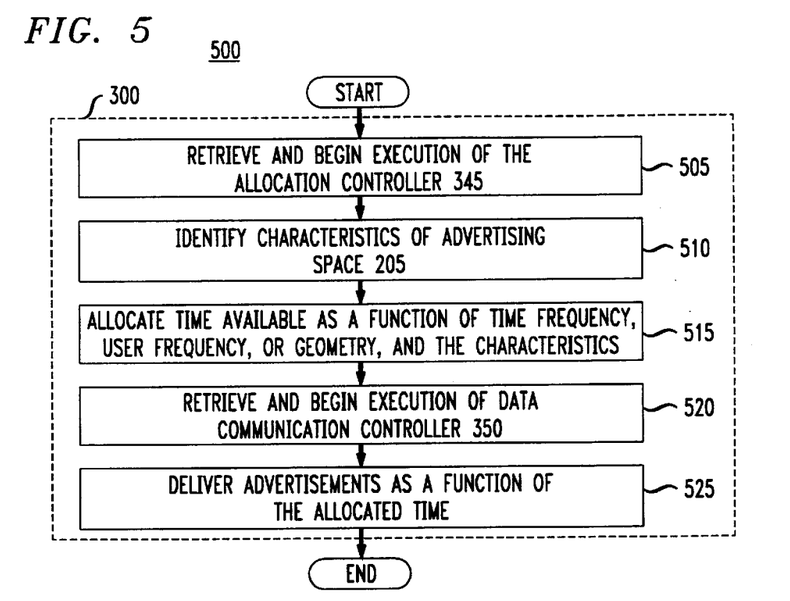
FIG. 5 illustrates a high-level flow diagram of an exemplary method of operating the processing circuitry of FIG. 3 to schedule and control delivery of advertising in the communications network of FIG. 1 according to the principles of the present invention.

Turning now to FIG. 5, illustrated is a high-level flow diagram (generally designated 500) of an exemplary method of operating processing circuitry 300 of ISP 110 to schedule and control delivery of advertising in communications network 100 according to the principles of the present invention. The illustrated flow diagram is software-based. Since, however, the present invention is not limited to applications implemented in software, FIG. 5, like FIGS. 1 to 4, is representative only.

To begin, exemplary time allocation controller 345 is retrieved and execution begins by processing circuitry 300, processing step 505. Time allocation controller 345 identifies at least one of a plurality of characteristics associated with particular advertising region 205 (e.g., height, width, depth, shape, format, audio, playtime, etc.), process step 510.

Time allocation controller 345 allocates time available in advertising region 205 in display device 210 of remote computer 105 between at least advertisements 355, 360 as a function of (1) the one or more identified characteristics associated with particular advertising region 205 and (2) at least one of (a) a desired user frequency, (b) a desired time frequency, or (c) a desired geometry (wherein the geometry has at least a zero dimension), for each of the at least two advertisements, process step 515.

Data communication controller 350 is retrieved and execution begins by processing circuitry 300, processing step 520. Data communication controller 350, which is associated with time allocation controller 345, delivers advertisements 355, 360 to one of exemplary remote computers 105a or 105n for display to an advertising region 205 according to the allocating of the time derived by time allocation controller 345, process step 525.

According to an advantageous embodiment, the solution where $\max_j |P(j)| \leq S$ may be suitably associated with exemplary flow diagram 500 to schedule advertisements as a function of at least one of a desired user frequency, time frequency or geometery. To illustrate the same it may be beneficial to consider the following examples.

As a first example, assume for each advertisement, i, that the user frequency varies by advertisement, but is always rational, that the geometry may be suitably specified by width, and that every advertisement has a time frequency equal to one. In this case, T (the number of available time slots) may be suitably set to the least common multiple of the denominators of the U(i) of advertisement, i; $w_i$ may be suitably set to T*U(i); $s_i$ may be suitably set to L(i); and S may be suitably set to the width of the advertising region. For any valid solution to the illustrated scheduling problem, for each slot, the total width of advertisements assigned to that slot is not larger than the width of advertising region 205. If a valid schedule does exist, then which set of advertisements to display can be determined for a given access to a provider by displaying all the advertisements that are assigned to one of the T slots.

This choice may of course be made in several different ways, including deterministically cycling through the T slots, choosing a random slot, choosing a random permutation of the slots and deterministically cycling through the T slots in the order of the permutation, or the like.

As a second example, assume for each advertisement, i, that the time frequency varies by advertisement, but is always rational, that the geometry may be suitably specified by width, and that every advertisement has a user frequency equal to one. In this case, T may be suitably set to the least common multiple of the denominators of the F(i) of advertisement, i; $w_i$ may be suitably set to T*F(i); $s_i$ may be suitably set to L(i); and S may be suitably set to the width of advertising region 205. For any valid solution to the illustrated scheduling problem, for each slot, the total width of advertisements assigned to that slot is not larger than the width of advertising region 205. If a valid schedule does exist, then all users may be treated the same, and at any instant in time, that which is displayed in advertising region 205 may be suitably described by the set of advertisements assigned to a one of the slots in the advertising assignment.

This choice of which slot to display may of course be made in several different ways, including deterministically cycling through the T slots, choosing a random slot, choosing a random permutation of the slots and deterministically cycling through the T slots in the order of the permutation, or the like.

As a final example, assume for each advertisement, i, that the user and time frequencies vary by advertisement, but are always rational, and that the geometry may be suitably the same as advertising region 205. In this case, T may be suitably set to the least common multiple of the denominators of the U(i) of advertisement, i; $w_i$ may be suitably set to T*U(i); $s_i$ may be suitably set to F(i); and S may be suitably set equal to one. For any valid solution to the illustrated scheduling problem, when a user first accesses a provider, the advertisements seen by that user are determined by choosing one of the T time slots. If a valid schedule does exist, then each of the advertisements, i, in time slot j are seen a fraction of $s_i$ of the time.

This choice of which slot to display may of course be made in several different ways, including cycling through either a deterministic or random permutation of advertisements, wherein each advertisement, i∈P(j), appears for a time proportional to $s_i$; the time unit may be fixed and the next advertisement may be chosen by choosing each advertisement, i∈P(j), with probability $s_i$.

As should be evident from the foregoing examples, the present invention introduces a sophisticated way of allocating advertising resources in a communications network, such as exemplary communications network 100, that optimizes utilization of exemplary advertising region 205. Those skilled in the pertinent art will again understand that although the principles of the present invention are described in the context of graphical advertisements, whose dimensions are described by width, height, depth, or the like, the present invention is adaptable arid associable with advertisements that include aural and the like, whose dimensions are described by time, volume or the like.

It is advantageous to discuss both off-line and on-line versions of an exemplary two-dimensional (parameter) advertising scheduling algorithm. In the off-line version, an entire set of advertisements to be scheduled is known in advance, and it is advantageous to adhere to $\max_j |P(j)| \leq S$, either with all of the requested advertisements, or by choosing an appropriate subset of the advertisements. In the on-line version, the advertisements arrive one at a time, and as each advertisement arrives, a decision must be made as to whether or not to include that advertisement in the schedule (i.e., should the provider agree to sell the given advertisement). Lastly, the foregoing analysis may be extended to higher dimensions (i.e., extended to scenarios wherein each advertisement is specified by more than two parameters and a general methodology is introduced for use with an arbitrary number of parameters (dimensions)).

Turning first to off-line algorithms, it remains advantageous to use two-dimensional (parameter) examples. Again assuming a set of time slots, T, and a set of advertisements, A, of arbitrary size and weight, then a determination must be made of whether there exists a valid assignment of A to T.

It is advantageous to define a set of n advertisements as "divisible" if their sizes, when largest to smallest, are $s_1, S_2, \ldots, s_n$ wherein each advertisement size $s_{i+1}$ evenly divides advertisement size $s_i$ (i.e., $s_i = k_i * s_{i+1}$, for some positive integer $k_i$) and $s_1$ evenly divides S. According to an advantageous embodiment ("GREEDY"):

all of the advertisements are sorted by size, from largest to smallest, each of the advertisements is assigned from the sorted order, such that advertisement, i, is assigned to a $w_i$ least full slots.

Assuming a divisible set of advertisements algorithm GREEDY can be proven to find a valid assignment if and only if one exists.

In another advantageous embodiment, one or more of the advertisement sizes $s_i$ are rounded up to the smallest values $S*2^{-k}$ that is not smaller than $s_i$ and then each of the advertisements is assigned from the sorted order, such that advertisement, i, is assigned to a $w_i$ least full slots. As yet a further example, consider the following question. Given a parameter T and a set of advertisements A, with divisible sizes, can we determine the subset $A' \subseteq A$, such that A' has a valid assignment of advertisements to slots, and A' maximizes the value $\Sigma_{i \in A'} w_i s_i$. This is an important question, since it maximizes the utilization of advertising regions. We can two-approximate this question in the following sense: we can find a subset $A' \subseteq A$, and a schedule for A', such that $$\sum_{i \in A'} w_i s_i \geq \frac{OPT}{2},$$

where OPT is the maximum value of $\Sigma_{i \in A'} w_i s_i$ over all subsets A'.

We use the following algorithm.

Let $A_S$ be the set of advertisements of size S, and let $A_{\bar{S}}$ be the remaining advertisements (all of size less than S).

Let $B_s = \Sigma_{i \in A_s} = S * w_i$

Let $B_{\bar{s}} = \Sigma_{i \in A_{\bar{s}}} S_i * w_i$

If $B_s \geq B_{\bar{s}}$, then the advertisements in $A_S$ (all of size S) are sorted by weight, from largest to smallest;

each of the advertisements is assigned from the sorted order, such that advertisement, i, is assigned to $w_i$ empty slots if $w_i$ empty slots are available, else it not assigned any slots;

next, the advertisements in $A_{\bar{S}}$ are sorted by size, from largest to smallest;

each of the advertisements is assigned from the sorted order, such that for advertisement, i, if there are at least $w_i$ slots that are at most $S-s_i$ full, advertisement i is assigned to a $w_i$ empty slot if $w_i$ empty slots are available, else it is not assigned any slots; and The subset A' becomes the advertisements that were assigned slots.

If $B_s < B_{\bar{S}}$, then the advertisements in $A_{\bar{S}}$ are sorted by size, from largest to smallest;

each of the advertisements is assigned from the sorted order, such that advertisement, i, if there are at least $w_i$ slots that are at most $S-s_i$ full, advertisement i is assigned to a $w_i$ least full slots, else it is not assigned any slots;

next, each of the advertisements in $A_S$ is assigned one-by-one such that advertisement, i, is assigned to a $w_i$ empty slots if $w_i$ empty slots are available, else it is not assigned any slots; and The subset A' becomes the advertisements that were assigned slots.

It can be proven that the foregoing finds a subset A' such that $$\sum_{i \in A'} w_i * s_i \geq \frac{OPT}{2},$$

where OPT is the maximum value of $\Sigma_{i \in A} \cdot w_i s_i$ over all possible subsets A'.

Turning next to on-line algorithms, it is again advantageous to use two-dimensional examples. Here, advertisements having specific dimensions arrive from customers, and the present method is responsible for indicating to each customer whether its advertisement will be accommodated. According to the present embodiment, once a particular advertisement has been accepted or rejected, the decision is irrevocable, however, the assignment of advertisements to slots can be altered after receiving each request from a customer. There is of course assumed to be a valid assignment for all accepted customer requests.

For any sequence, C, of customer requests, let OPT(C) be the maximum over all off-line algorithms and all subsets A of the customer requests that are accepted, of $\Sigma_{i \in A} w_i s_i$. For any sequence of customer requests and for any algorithm L, let alg(L,C) be $\Sigma_{i \in A} \cdot w_i s_i$, where A' is the set of requests that are accepted. The object of the present embodiment is to find the algorithm L that minimizes the quantity $\max_C(OPT(C))/(alg(L,C))$. According to an advantageous embodiment, defined OL-GREEDY herein, the following procedure is repeated for each new customer request:

The new customer request is tentatively added to the set of accepted requests.

The GREEDY algorithm is applied to this set.

If GREEDY finds a valid solution, then the new request is accepted. Else it is rejected and the request is removed from the set of accepted requests.

If it is assumed that each advertisement has size $S*2^{-j}$ for some non-negative integer j, and that $Z<S/2$ is an upper bound on the maximum size of an advertisement, then it can be proved that $\max_C(OPT(C))/(alg(OL\text{-}GREEDY),C)) \leq S/(S-2Z)$. If OL-GREEDY is able to place every advertisement in a sequence C of requests, then $(OPT(C))/(alg(OL\text{-}GREEDY,C))=1$.

Turning next to scenarios where the advertisements are specified by more than just the two parameters of size and weight used hereinabove, it is advantageous to use the same basic algorithm set forth hereinabove when the advertisements adhere to a generalization of the divisibility property.

It is assumed that each advertisement i is specified by a weight, $w_i$, and an m dimensional rectangle of size $(s^1_i, s^2_i, \ldots, s^m_i)$, and T time slots, but now each slot is an m dimensional rectangle of size $(S^1, S^2, \ldots, S^m)$.

Since advertisement sizes are now specified by more than one dimension, not all orderings of the advertisements within a slot require the same amount of m dimensional volume, and thus advertisements that are assigned to a slot also need to be assigned to a location within that slot. An advertisement assignment now consists of an assignment of advertisements to slots such that advertisement i is assigned exactly once to each of $w_i$ slots, and within each assigned slot j, advertisement i has an assigned location $L_{(ij)}=(l^1_{(ij)}, l^2_{(ij)}, \ldots, l^m_{(ij)})$ subject to a "non-overlap" property, namely, no other advertisement is assigned to a location within the m dimensional rectangle defined by $L_{(ij)}$ and the point $L'_{(ij)} = (l^1_{(ij)}+s^1_i, l^2_{(ij)}+s^2_i, \ldots, l^m_{(ij)}+s^m_i)$. An advertising schedule is valid, if, for each advertisement i and slot j, $l_{ij}^1+s_i^1 \leq S^1$, $l_{ij}^2+s_i^2 \leq S^2, \ldots, l_{ij}^m+s_i^m \leq S^m$.

The generalization of the divisibility property to m dimensions, denoted the m-divisibility property herein, is that there exists a series of allowed advertisement shapes $P_0=(S^1, S^2, \ldots, S^m)$, $P_1=(P_1^1, P_1^2, \ldots, P_1^m)$, $P_2=(P_2^1, P_2^2, \ldots, P_2^m), \ldots$, such that for each $t \geq 1$, there exists a dimension $q_t$, $1 \leq q_t \leq m$, and an integer $k_t \geq 2$, such that $p_{t-1}^{q_t} = k_t * p_t^{q_t}$ and that $p_{t-1}^r = p_t^r$ for all $r \neq q_t$, wherein $k_0=1$. Intuitively, this divisibility property states that there exists a sequence of possible advertisement shapes $Z_0, Z_1, Z_2, \ldots$, such that for all $t \geq 1$, $Z_{(t-1)}$ is formed exactly by combining $k_t$ of the shapes $Z_t$.

According to an advantageous embodiment, to generate a n dimensional (parameter) advertisement schedule, a set of slot partitions are defined, the partitions of the m dimensional slot using a divisible set of allowed advertisement sizes. In this set there may be as many partitions as there are allowed advertisement sizes, which is possibly infinite. The first partition in the set divides the slot into $k_0$ regions, each of shape $P_1$. The second partition of the set divides each of the regions in the first partition into $k_1$ regions, each of size $P_2$. In general, the $t^{th}$ partition in the set divides each region in the $t-1^{st}$ partition into $k_{t-1}$ regions, each of size $P_t$. For purposes of illustration, it may be useful to refer a region U in the $u^{th}$ partition of the set as an "ancestor" of a region in the $v^{th}$ partition, $u \leq v$, if U contains V (every region may be thought of as an ancestor of itself). For a set of n-parameter advertisements that adheres to the m-divisibility property, and T time slots, an advantageous embodiment (denoted n-GREEDY) schedules the advertisements as follows:

Define a two-parameter advertisement scheduling problem with S=1 and T unchanged as follows: For each advertisement i of weight $w_1$ and size $P_t$ in the n-parameter problem, here is an advertisement with the same weight and with size $s_i=1/(\Pi_{u=0}^t k_u)$;

Run algorithm GREEDY on the two-parameter advertisement problem. In the algorithm, if in assigning an advertisement i to a $w_i$ least full slots, there is more than one possible choice for $w_i$ least full slots, assign the advertisement to the smallest numbered slots that have minimum fullness;

If a two-parameter advertisement is assigned to slot j, then the corresponding n parameter advertisement is assigned to slot j; and Within a slot, the advertisements are assigned to locations in order of non-increasing size, where each advertisement of shape $P_t$ is placed in any region R of the $t^{th}$ partition of the set of slot partitions such that no previous advertisement was placed in any ancestor of R.

Finding an optimal solution to the n dimensional problem provides a solution to the case where the advertisements may be specified in terms of height, width, and either user frequency or time frequency. The above-provided analysis may also be suitably used to find a solution to the triple assignment problem discussed hereinbelow.

Turning lastly to a triple assignment schedule, wherein each advertisement is specified by a user frequency U(i), a time frequency F(i), and a width L(i). According to an advantageous embodiment, T sets of slots are given, wherein each set of slots consists of F slots of size S. A primary goal of this embodiment is to produce an advertisement assignment wherein advertisement i is assigned to U(i)*T sets of advertisements, and in each set wherein advertisement i is assigned, it is assigned exactly once to F(i)*F slots in that set. If P(j,k) is the set of advertisements assigned to the $k^{th}$ slot in set j, then an advertisement assignment is valid if $$\max_{(j,k)} \Sigma_{i \in P(j,k)} L(i) \leq S.$$

In accordance with the above-identified primary goal of this embodiment, a valid schedule, if one exists, may be efficiently displayed as follows:

when a user accesses a provider, a set of slots is chosen; and at each time step, a new slot from the set is chosen, and displayed, cycling through the slots either randomly or deterministically.

Advertisements may or may not be assigned to consecutive slots within a set, and the advertisements may or may not be aligned—if the advertisements assigned to a slot are also assigned non-overlapping locations, then an advertisement may always be assigned to the same location. If advertisements are to be both consecutive and aligned within the sets of slots, a solution to the triple assignment scheduling problem entails assigning each advertisement to a rectangle within each set of advertisement slots, wherein the width of the rectangle for advertisement i is L(i), and the height of the rectangle is F(i)*F. In this case, the triple assignment problem may be treated simply as an instance of the above-described n-parameter advertising problem, wherein n equals 3.

However, in some cases, schedules without the consecutive or alignment restrictions may be more efficient than those that have these restrictions. For example, if a set of 3 slots contains three advertisements, each of which have time frequency 2/3, and size S/2, then there exists a valid schedule for those three slots in the case where the advertisements need not be either consecutive or aligned. However, if either condition is required, then there does not exist a valid schedule. It can be proven that for a set of advertisements whose time frequency and advertisement width are divisible, then if there exists any valid schedule to the triple assignment scheduling problem, then there is a valid schedule that is both consecutive and aligned. In the case where the time frequency and advertisement width are divisible, it is sufficient to describe the triple assignment scheduling problem as a three-parameter advertisement scheduling problem, and use the algorithm described hereinabove or some other suitably arranged algorithm according to the principles of the present invention.

The fact that GREEDY finds a consecutive placement of advertisements within a set provides some added benefits. Advertisements may be sold that substantially guarantee whether or not a user sees the same advertisements in consecutive time steps. An advertiser may want all the time slots where the advertisement appears to be consecutive (i.e., to make a long impression), or the time slots not to be consecutive (i.e., to serve as constant reminders). In the first case, it suffices to use the schedule that is provided by GREEDY. In the second, time slots may simply be interleaved from the first half of the set with slots from the second half of the set to substantially guarantee that the only advertisements that appear in consecutive slots are advertisements that appear in every slot. In fact, by recursively assigning the order of slots assigned to each half in the same manner, the advertisements are evenly spaced, or more precisely, if an advertisement i appears in a fraction of $\frac{1}{2}^k$ slots, then there are exactly $2^k - 1$ slots where i does not appear between consecutive slots where i does appear.

The fact that GREEDY finds an aligned placement of advertisements within a set is also useful. GREEDY can substantially guarantee whether or not an advertisement always appears in the same location within the advertising region. To substantially guarantee that it is always in the same location, the assignment of locations provided by the algorithm n-GREEDY are used, wherein n=3. Consecutive appearances of an advertisement may be substantially guaranteed to be in different locations by reversing the order of the advertisements in all even numbered slots.

Figure 6:
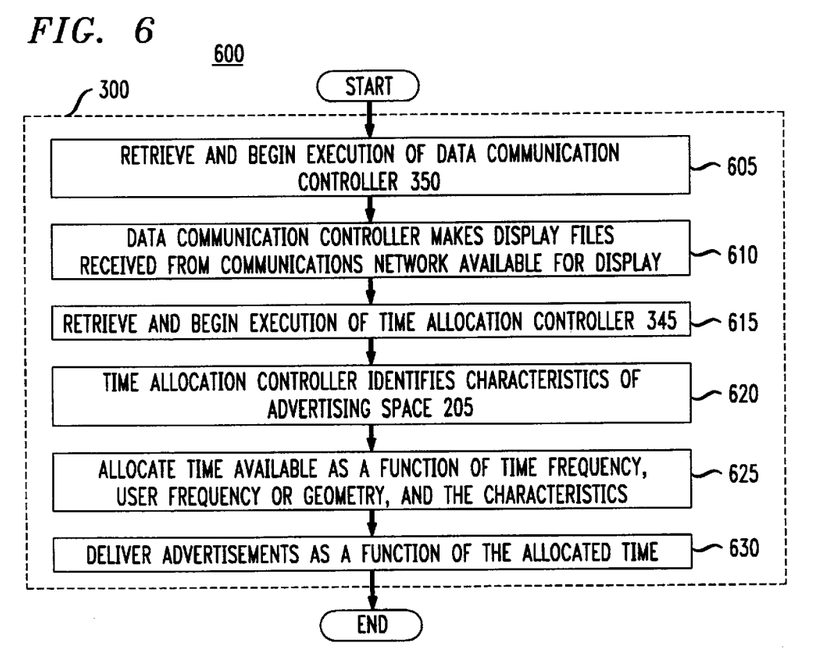
FIG. 6 illustrates a high-level flow diagram of an exemplary remote computer program that is capable of operating the processing circuitry of FIG. 3 when implemented in one of the remote computers of FIG. 1 to schedule and control delivery of display files from the communications network to the remote computer according to the principles of the present invention.

Turning lastly to FIG. 6, illustrated is a high-level flow diagram of an exemplary remote computer program (generally designated 600) that is capable of operating processing circuitry 300 when implemented in one of remote computers 105 to schedule and control delivery of display files from communications network 100 to remote computer 105 according to the principles of the present invention. Remote computer is associated with display device 210.

Exemplary remote computer program 600, such as a suitably arranged Internet browser, is software-based. FIG. 6, like the prior figures, is representative only. Remote computer program 600 includes each of time allocation controller 345 and data communication controller 350.

To begin, data communication controller 350 is retrieved and executed by processing circuitry 300 of remote computer 105, process step 605. Data communication controller 350 makes display files 365 received from communications network 100 available to a display screen 215 of remote computer 105, display screen 215 having advertising region 205 therein, process step 610. Time allocation controller 345 is retrieved and executed by processing circuitry 300 of remote computer 105, process step 615. Time allocation controller 345 identifies at least one of a plurality of characteristics associated with advertising region 205 (e.g., height, width, depth, shape, format, audio, playtime, etc.), process step 620. Time allocation controller 345 allocates time available in advertising region 205 between at least advertisements 355, 360 as a function of (1) the one or more identified characteristics associated with particular advertising region 205 and (2) at least one of (a) a desired user frequency, (b) a desired time frequency, or (c) a desired geometry (wherein the geometry has at least a zero dimension), for each of the at least two advertisements, process step 625.

Data communication controller 350, which is associated with time allocation controller 345, delivers at least advertisements 355, 360 to display screen 215 of remote computer 105 for display in advertising region 205 according to the allocating of the time derived by time allocation controller 345, process step 630.

Although the present invention has been described in detail, those skilled in the art should understand that they can make various changes, substitutions and alterations herein without departing from the spirit and scope of the invention in its broadest form.

What is claimed is:

1. A system for scheduling and controlling delivery of advertising in a communications network, comprising:

a time allocation controller that allocates time available in an advertising region in a display device of a remote computer between at least two advertisements as a function of a desired user frequency, a desired time frequency and a desired geometry, for each of said at least two advertisements; said time allocation controller employing a geometry of each of said advertisements to allocate space within said advertising region that allows at least one of said advertisements to be displayed in said advertising region; and data communication controller, associated with said time allocation controller, that delivers said advertisements to said remote computer for display in said advertising region according to an allocation of said time and said space.

2. The system as recited in claim 1 wherein said at least two advertisements are graphical representations having a width and a height.

3. The system as recited in claim 1 wherein said data communication controller delivers said at least two advertisements to said advertising region in a pseudo-random order.

4. The system as recited in claim 1 wherein said advertising region is located within a display file delivered by a server on said communications network.

5. The system as recited in claim 1 wherein said advertising region is located within a screen associated with a remote computer program interacting with said communications network.

6. The system as recited in claim 1 wherein said communications network is the Internet.

7. A method for scheduling and controlling delivery of advertising in a communications network, comprising the steps of:

allocating time available in an advertising region in a display device of a remote computer between at least two advertisements as a function of a desired user frequency, a desired time frequency, and a desired geometry, for each of said advertisements;

allocating space within said advertising region to allow at least one of said advertisements to be displayed in said advertising region based upon based upon a geometry of each of said advertisements; and delivering said at least two advertisements to said remote computer for display in said advertising region according to an allocation of said time and said space.

8. The method as recited in claim 7 wherein said at least two advertisements are graphical representations having a width and a height.

9. The method as recited in claim 7 wherein said step of delivering comprises the step of delivering said at least two advertisements to said advertising region in a pseudo-random order.

10. The method as recited in claim 7 wherein said advertising region is located within a display file delivered by a server on said communications network.

11. The method as recited in claim 7 wherein said advertising region is associated with a screen of a remote computer program interacting with said communications network.

12. The method as recited in claim 7 wherein said communications network is the Internet.

13. A communications network, comprising:

a data communication controller that makes display files available to remote computers, at least some of said display files having an advertising region therein; and a system for scheduling and controlling delivery of advertising to said advertising region, said system allocating time available in said advertising region of said display files between at least two advertisements as a function of a desired user frequency, a desired time frequency, and a desired geometry, for each of said advertisements, said system employing a geometry of each of said advertisements to allocate space within said advertising region that allows at least one of said advertisements to be displayed in said advertising region, and said data communication controller delivering said advertisements to said at least some of said display files and making said display files available to ones of said remote computers for display therein according to an allocation of said time and said space.

14. The communications network as recited in claim 13 wherein said at least two advertisements are graphical representations having a width and a height.

15. The communications network as recited in claim 13 wherein said data communication controller delivers said at least two advertisements in a pseudo-random order.

16. The communications network as recited in claim 13 wherein said communications network is the Internet.

17. The communications network as recited in claim 16 wherein at least one of said data communication controller and said system is associated with an Internet Service Provider (ISP).

18. A remote computer program that is capable of executing within a remote computer of a communications network, said remote computer program comprising:

a data communication controller that makes display files received from said communications network available for display to a display screen of said remote computer, said display screen having an advertising region therein; and a scheduling controller that controls delivery of advertising to said advertising region by allocating time available in said advertising region between at least two advertisements as a function of a desired user frequency, a desired time frequency, and a desired geometry, for each of said at least two advertisements, said scheduling controller employing a geometry of each of said advertisements to allocate space within said advertising region that allows at least one of said advertisements to be displayed in said advertising regions and said data communication controller delivering said advertisements with at least some of said display files to said remote computer for display on said display screen according to an allocation of said time and said space.

19. The remote computer program as recited in claim 18 wherein said at least two advertisements are graphical representations having a width and a height.

20. The remote computer program as recited in claim 18 wherein said data communication controller delivers said at least two advertisements in a pseudo-random order.

21. The remote computer program as recited in claim 18 wherein said communications network is the Internet.

22. The remote computer program as recited in claim 21 wherein said remote computer program is a World Wide Web browser.

* * * * *